United States Patent
Chen et al.

(10) Patent No.: US 6,761,421 B2
(45) Date of Patent: Jul. 13, 2004

(54) COMPUTER ENCLOSURE WITH PIVOTING OPENING MEANS

(75) Inventors: Jung-Chi Chen, Tu-Chen (TW); Yun-Lung Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 101 days.

(21) Appl. No.: 10/128,165

(22) Filed: Apr. 22, 2002

(65) Prior Publication Data

US 2003/0151334 A1 Aug. 14, 2003

(30) Foreign Application Priority Data

Feb. 8, 2002 (TW) ........................... 91201717 U

(51) Int. Cl.⁷ .............................................. H05K 7/18
(52) U.S. Cl. .................................. 312/223.2; 312/325
(58) Field of Search ............................. 220/817, 345.1; 312/223.2, 327, 326, 328, 325, 322, 139.1, 323, 329; 16/366, 289; 292/91, 341.15, 341.12; 361/683

(56) References Cited

U.S. PATENT DOCUMENTS

| | | | | |
|---|---|---|---|---|
| 581,664 A | * | 4/1897 | Martin et al. ................... 5/58 |
| 1,059,221 A | * | 4/1913 | Saylor ........................ 220/533 |
| 1,917,740 A | * | 7/1933 | Strand ............................ 16/85 |
| 1,925,409 A | * | 9/1933 | Shriver ........................ 312/266 |
| 1,988,606 A | * | 1/1935 | Milhening ............... 206/45.28 |
| 4,522,288 A | * | 6/1985 | Wickman et al. ........... 190/106 |
| 5,339,494 A | * | 8/1994 | Esau et al. .................... 16/294 |
| 5,598,318 A | * | 1/1997 | Dewitt et al. ............... 361/683 |
| 5,995,363 A | * | 11/1999 | Wu ............................. 361/679 |
| 6,442,801 B1 | * | 9/2002 | Kim ............................. 16/361 |
| 6,603,655 B2 | * | 8/2003 | Hrehor et al. .............. 361/683 |
| 2003/0151332 A1 | * | 8/2003 | Chen ....................... 312/223.2 |
| 2003/0161098 A1 | * | 8/2003 | Chen et al. ................. 361/683 |

FOREIGN PATENT DOCUMENTS

JP         09177419         *    7/1997

* cited by examiner

Primary Examiner—Janet M. Wilkens
(74) Attorney, Agent, or Firm—Wei Te Chung

(57) ABSTRACT

A computer enclosure includes a base (10), a hood (30), a pair of locating plates (50), a pair of positioning plates (60), and a pair of connecting mechanisms (70). The hood includes a top cover (32), and a bezel (38) perpendicularly attached to an end of the top cover. The locating plates are secured to opposite sides of the base. The positioning plates are secured to opposite sides of the hood near the bezel. The connecting mechanisms are disposed between the base and the hood, and pivotably connected with the locating plates and the positioning plates. The hood is thereby pivotably secured to the base.

16 Claims, 4 Drawing Sheets

COMPUTER ENCLOSURE WITH PIVOTING OPENING MEANS

BACKGROUND OF THE INVENTION

1. Field of the Invention

The present invention relates to computer enclosures, and more particularly to a computer enclosure having pivoting means so that the enclosure can be readily opened and closed.

2. Description of Related Art

New computer components and accessories are continually being developed. This necessitates regular maintenance, renewal and upgrading of components and fittings of existing computers. Accordingly, a computer enclosure should readily allow access to an interior thereof.

A typical computer enclosure comprises a base, a front bezel, a pair of side panels and a cover, all of which are separate parts. In assembly, the bezel, the side panels and the cover are directly secured to the base with screws. In order to remove the bezel or the cover, the screws must be disengaged from the base one by one. This is unduly laborious and time-consuming.

Taiwan Patent Application No. 89211639 discloses another conventional computer enclosure. The base defines a plurality of slots at opposite sides thereof, and a plurality of holes at a front panel. The bezel inwardly forms a plurality of protrusions and hooks thereon. The cover has a pair of parallel flanges with a plurality of slots defined therein. Each of two side panels forms a plurality of hooks at top and bottom edges thereof. In assembly of the enclosure, the cover is secured to the base with screws. The hooks of the side panels are engaged in the slots of the cover and the slots of the base. Screws enhance engagement of the side panels with the cover and the base. The protrusions and hooks of the bezel are inserted into the holes of the front panel of the base.

To open the enclosure, the screws are detached from the base one by one. The protrusions and hooks of the bezel are disengaged from the holes of the front panel of the base. The hooks of the side panels are disengaged from the slots of the base. Thus, the bezel, the side panels and the cover are detached from the base. This procedure is unduly laborious and time-consuming.

It is strongly desired to provide an improved computer enclosure which overcomes the above-mentioned problems.

SUMMARY OF THE INVENTION

Accordingly, an object of the present invention is to provide a computer enclosure which can be readily opened and closed.

In order to achieve the object set out above, a computer enclosure of the present invention comprises a base, a hood, a pair of locating plates, a pair of positioning plates and a pair of connecting mechanisms. The hood comprises a top cover, and a bezel perpendicularly attached to an end of the top cover. The locating plates are secured to opposite sides of the base. Each locating plate forms a pair of pivots thereon. The positioning plates are secured to opposite sides of the hood near the bezel. Each positioning plate forms a pivot thereon. Each connecting mechanism comprises a pair of first levers and a second lever pivotably connected together. Each first lever defines a first pivot hole pivotably engaged with the corresponding pivot of the corresponding locating plate. Each second lever defines a second pivot hole pivotably engaged with the pivot of the corresponding positioning plate. The hood is thereby pivotably secured to the base.

Other objects, advantages and novel features of the present invention will become more apparent from the following detailed description when taken in conjunction with the accompanying drawings.

DETAILED DESCRIPTION OF THE INVENTION

Figure 1:
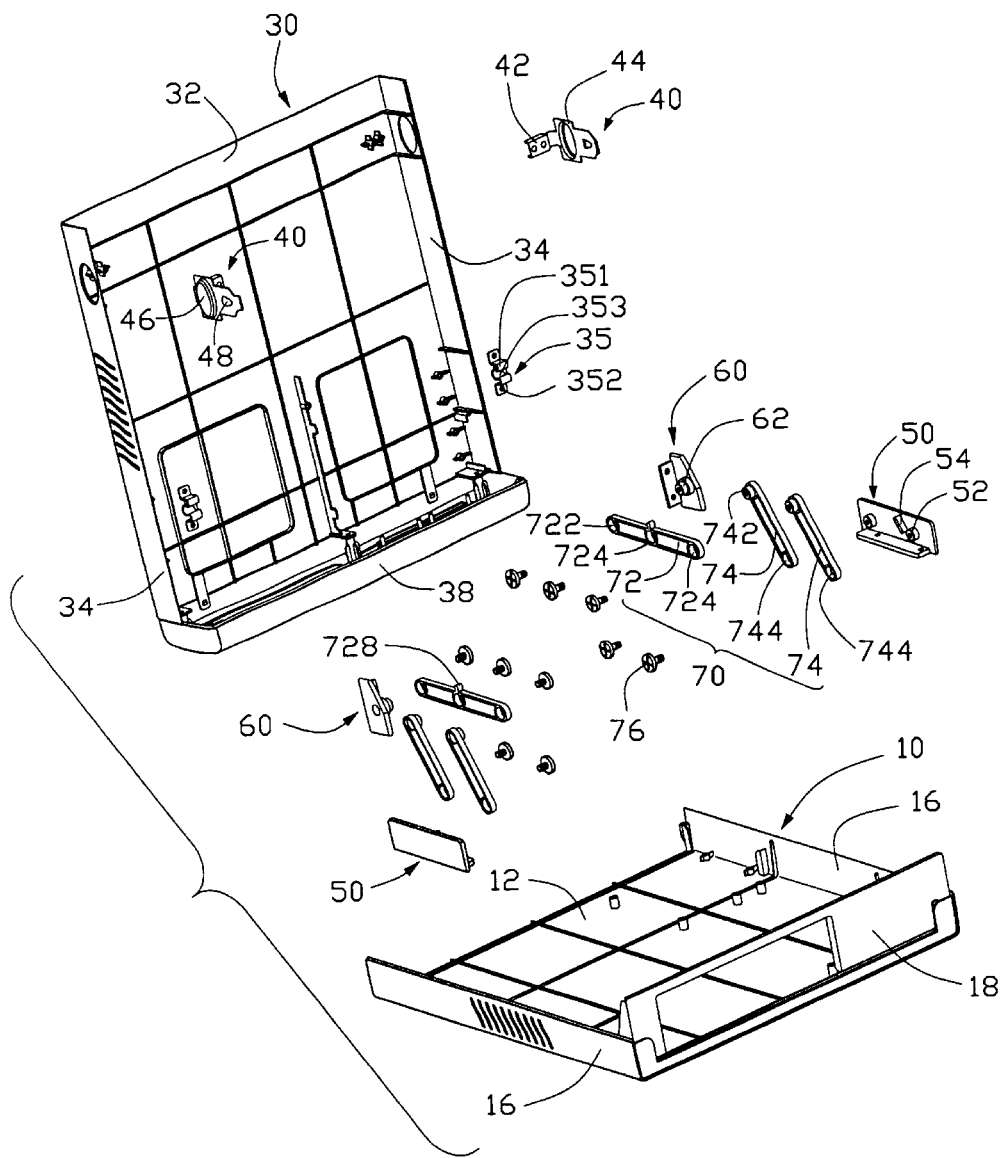
FIG. 1 is an exploded perspective view of a computer enclosure in accordance with a preferred embodiment of the present invention.

Reference will now be made to the drawing figures to describe the present invention in detail.

Referring to FIGS. 1–4, a computer enclosure in accordance with a preferred embodiment of the present invention comprises a rectangular base 10, a hood 30, a pair of locating plates 50, a pair of positioning plates 60 and a pair of connecting mechanisms 70. The connecting mechanisms 70 are pivotably engaged with the base 10 and the hood 30, and cooperate with a pair of locking devices 40 of the hood 30 to facilitate opening and closing of the computer enclosure.

Figure 2:
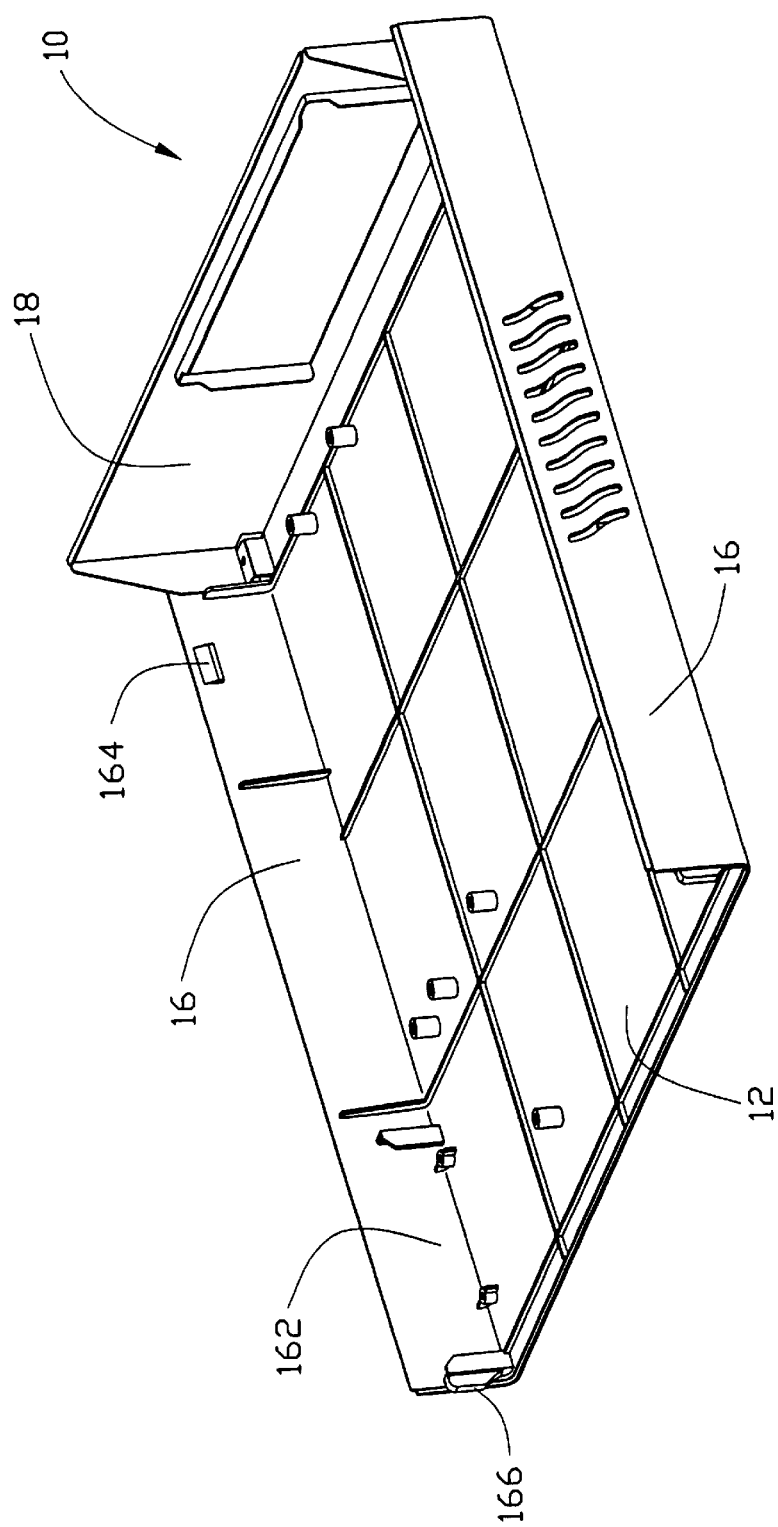
FIG. 2 is an enlarged perspective view of a base of the enclosure of FIG. 1, viewed from another aspect.

Referring particularly to FIG. 2, the base 10 comprises a bottom panel 12, a pair of parallel side panels 16, and a rear panel 18. The side panels 16 and the rear panel 18 all extend upwardly from the bottom panel 12. A locating area 162 is defined at a front portion of a junction of the bottom panel 12 and each side panel 16. A first engaging tab 166 is formed at a front end of each side panel 16, in front of and adjacent the corresponding locating area 162. A first protrusion 164 is inwardly formed from each side panel 16 near the rear panel 18.

Figure 3:
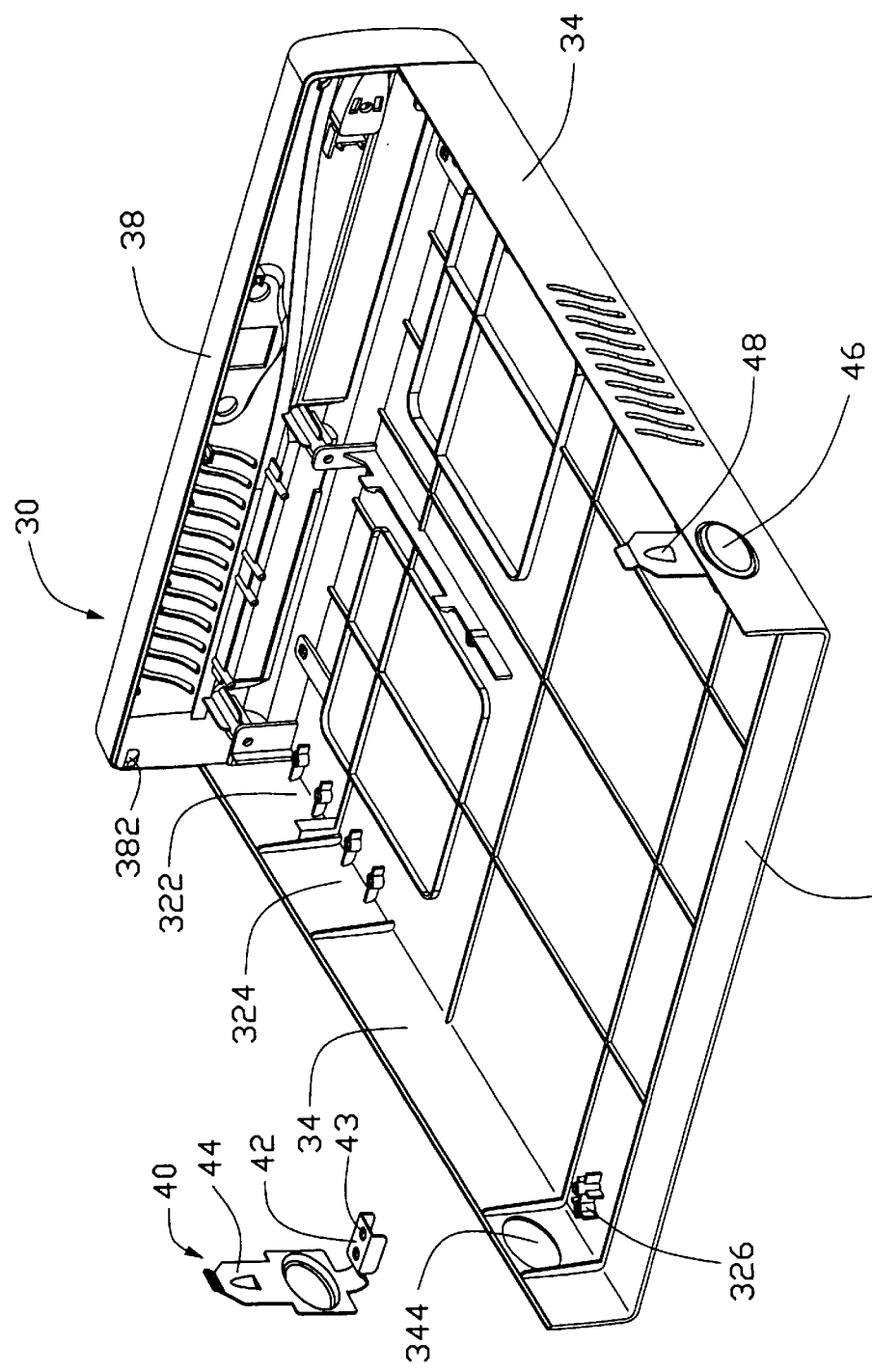
FIG. 3 is an enlarged perspective view of a hood of the enclosure of FIG. 1, viewed with the hood inverted.

Referring particularly to FIG. 3, the hood 30 comprises a top cover 32, a pair of sidewalls 34, a bezel 38, a pair of resilient clamps 35 (see FIG. 1) and a pair of locking devices 40. The bezel 38 is attached to an end of the top cover 32, and is generally perpendicular to the top cover 32. A pair of positioning areas 322, 324 is defined at a junction of the top cover 32 and each sidewall 34, near the bezel 38. A pair of locating posts 326 is inwardly formed on each of opposite sides of the top cover 32, distal from the bezel 38. A threaded hole (not labeled) is defined in each locating post 326. An opening 344 is defined in each sidewall 34 near the corresponding pair of locating posts 326. A pair of curved second engaging tabs 382 is formed at opposite sides of the bezel 38 respectively, corresponding to the first engaging tabs 166 of the base 10.

Each resilient clamp 35 is for being secured to the corresponding positioning area 324 of the hood 30. The resilient clamp 35 comprises a pair of integrally joined central clasps 351, and a pair of fastening tabs 352 extending from opposite outmost ends of the clasps 351 respectively. A socket 353 is defined between the clasps 351.

Each locking device 40 comprises a fixing portion 42, and an elastic portion 44 extending perpendicularly inwardly from the fixing portion 42. A pair of through holes 43 is defined in the fixing portion 42, corresponding to threaded holes (not labeled) of a corresponding pair of the locating posts 326. The elastic portion 44 provides the locking device 40 with resiliency. A button 46 is outwardly stamped from the elastic portion 44, for being received in the opening 344 of the corresponding sidewall 34. A second protrusion 48 is outwardly formed from a distal end of the elastic portion 44, for engaging with the corresponding first protrusion 164 of the base 10.

Each locating plate 50 has a generally L-shaped profile. The locating plate 50 is for being secured to the corresponding locating area 162 of the base 10. A pair of spaced first pivots 52 is inwardly formed on the locating plate 50. A slanted stop 54 is inwardly formed between the first pivots 52.

Each positioning plate 60 has a generally L-shaped profile. The positioning plate 60 is for being secured to the corresponding positioning area 322 of the hood 30. A second pivot 62 is inwardly formed on the positioning plate 60.

Each connecting mechanism 70 comprises a pair of parallel first levers 74, a second lever 72, and a plurality of screws 76. A third pivot 742 is inwardly formed at a top end of each first lever 74. A first pivot hole 744 is defined in a bottom end of each first lever 74, corresponding to the first pivots 52 of the locating plate 50. A second pivot hole 722 is defined in a front end of the second lever 72, for engaging with the second pivot 62 of the corresponding positioning plate 60. A pair of third pivot holes 724 is respectively defined in a rear end and in a central portion of the second lever 72, for engaging with the third pivots 742 of the first levers 74. A distance between the third pivot holes 724 of each second lever 72 is similar to a distance between the first pivots 52 of each locating plate 50. A nub latch 728 is formed on a top of the central portion of the second lever 72 above the third pivot hole 724, for being received in the socket 353 of the corresponding resilient clamp 35 when the computer enclosure is closed.

Figure 4:
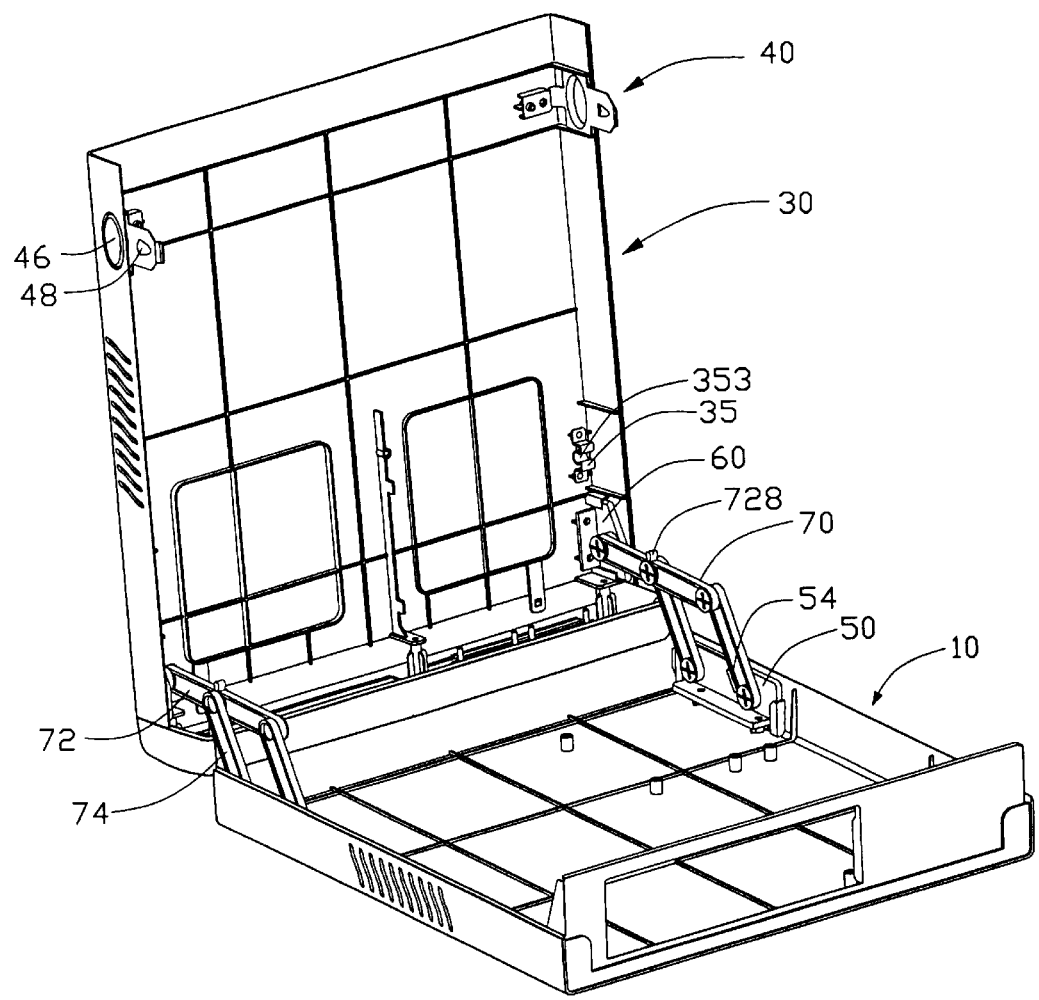
FIG. 4 is an assembled view of FIG. 1.

Referring particularly to FIG. 4, in assembly, the fastening tabs 352 of the resilient clamps 35 are secured to the positioning areas 324 of the hood 30 by conventional means. The first pivots 52 of the locating plates 50 are pivotably engaged in the first pivot holes 744 of the first levers 74. The locating plates 50 are secured to the locating areas 162 of the base 10. The third pivots 742 of the first levers 74 are pivotably engaged in the third pivot holes 724 of the second levers 72 using the screws 76. The second pivots 62 of the positioning plates 60 are pivotably engaged in the second pivot holes 722 of the second levers 72. The positioning plates 60 are secured to the positioning areas 322 of the hood 30 by conventional means.

Four bolts (not labeled) are respectively extended through the through holes 43 of the fixing portions 42 of the locking devices 40, to engage in the threaded holes (not labeled) of the posts 326 of the hood 30. The locking devices 40 are thus secured to the hood 30. The buttons 46 of the locking devices 40 are received in the openings 344 of the hood 30. The second protrusions 48 of the locking devices 40 are snappingly engaged with the first protrusions 164 of the base 10, and the second engaging tabs 382 of the bezel 38 are snappingly engaged with the first engaging tabs 166 of the base 10 when the computer enclosure is closed. Thus, the hood 30 is pivotably secured to the base 10 by the connecting mechanisms 70. When the hood 30 is in a closed position, the nub latches 728 of the second levers 72 are resiliently received in the sockets 353 of the resilient clamps 35. This enhances stability of the connecting mechanisms 70 relative to the base 10 and the hood 30.

To open the computer enclosure, the buttons 46 of the locking devices 40 are pushed inwardly. The second protrusions 48 of the locking devices 40 are thus released from the first protrusions 164 of the base 10. The hood 30 is lifted up, causing the nub latches 728 of the second levers 72 to exit the sockets 353 of the resilient clamps 35. The second engaging tabs 382 of the bezel 38 are accordingly disengaged from the first engaging tabs 166 of the base 10. The hood 30 is rotated upwardly and forwardly away from the base 10, until the first levers 74 of the connecting mechanisms 70 are blocked by the corresponding slanted stops 54 of the locating plates 50.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer enclosure comprising:
   a base comprising bottom and side panels;
   a hood comprising a cover and a bezel perpendicularly attached to an end of the cover;
   a pair of positioning plates secured to opposite sides of the hood near the bezel;
   a pair of locating plates secured to opposite sides of the base; and
   a pair of connecting mechanisms disposed between the base and the hood, the connecting mechanisms pivotably connected with the positioning plates and the locating plates, thus securing the hood to the base, wherein
   each of the connecting mechanisms comprises a first lever and a second lever pivotably connected together, and wherein a latch is formed on the second lever, a pair of resilient clamps is secured to the cover, each of the resilient clamps comprises a pair of clasps defining a socket there between the socket detachably receives the latch.

2. The computer enclosure as claimed in claim 1, wherein the first lever defines a first pivot hole, and wherein each of the locating plates forms a first pivot thereon pivotably engaged in a corresponding first pivot hole.

3. The computer enclosure as claimed in claim 2, wherein the second lever defines a second pivot hole, and wherein each of the positioning plates forms a second pivot thereon pivotably engaged in a corresponding second pivot hole.

4. The computer enclosure as claimed in claim 1, at wherein a stop is perpendicularly formed on each of the locating plates for blocking a corresponding first lever.

5. The computer enclosure as claimed in claim 1, wherein a pair of locking devices is secured to opposite sides of the cover.

6. The computer enclosure as claimed in claim 5, wherein a first protrusion is formed on each of the side panels of the base.

7. The computer enclosure as claimed in claim 6, wherein a pair of openings is respectively defined in opposite sidewalls of the cover.

8. The computer enclosure as claimed in claim 7, wherein each of the locking devices has a button movably received in a corresponding opening of the cover, and further has a second protrusion detachably engaged with a corresponding first protrusion of the base.

9. The computer enclosure as claimed in claim 1, wherein a first engaging member is formed at a front end of each of the side panels, and wherein a second engaging member is formed on the bezel detachably engaging with the first engaging member.

10. A computer enclosure comprising:

a base comprising bottom and side panels;

a hood having a front bezel and a cover, the cover having a pair of resilient clamps secured thereon, each of the resilient clamps defining a socket between two clasps thereof;

a pair of connecting mechanisms each having a hinge structure, the connecting mechanisms being pivotably secured to the hood between the front bezel and the resilient clamps and pivotably secured to the base, each of the connecting mechanisms forming a latch received in a corresponding socket for enhancing stability of the connecting mechanisms relative to the computer enclosure.

11. The computer enclosure as claimed in claim 10, wherein each of the connecting mechanisms comprises a first lever and a second lever pivotably connected together to form the hinge structure.

12. The computer enclosure as claimed in claim 11, wherein a first pivot is formed at each of opposite sides of the base, and wherein a first pivot hole is defined in the first lever, the first pivot being pivotably engaged in a corresponding first pivot hole.

13. The computer enclosure as claimed in claim 12, wherein a second pivot is formed at each of opposite sides of the cover between the front bezel and the resilient clamps, and wherein a second pivot hole is defined in the second lever, the second pivot being pivotably engaged in a corresponding second pivot hole.

14. The computer enclosure as claimed in claim 10, wherein an opening is defined in each of opposite sidewalls of the cover, and wherein a pair of locking devices is attached to opposite sides of the cover, each of the locking devices forming a button movably received in a corresponding opening.

15. A computer enclosure comprising:

a base comprising bottom and side panels;

a hood comprising a cover and a bezel perpendicularly attached to an end of the cover;

a pair of positioning plates secured to opposite sides of the hood near the bezel;

a pair of locating plates secured to opposite sides of the base; and a pair of connecting mechanisms disposed between the base and the hood, the connecting mechanisms pivotably connected with the positioning plates and the locating plates, thus securing the hood to the base, wherein each of the connecting mechanisms comprises a pair of first levers each pivotably connected with a corresponding locating plate about a single pivotal point, a second lever pivotably connected with a corresponding positioning plate, the second lever having a central portion and an end portion distant from the positioning plate pivotably connected with the first levers, a slanted stop being formed on each of the locating plates for blocking pivoting movement of the first levers relative to the locating plates; wherein both said pair of first levers are moveable in a parallel manner with each other.

16. A computer enclosure comprising:

a base comprising bottom and two opposite side panels; and a hood comprising a top cover and a front bezel; and a four-bar linkage structure securing one of said side panels and the top cover, and including a pair of first short levers and a second long; wherein a bottom end of each of the first short levers is pivotally connected to the corresponding side panel about a single pivotal point, top ends of the first short levers are pivotally connected to the second long lever, and one end of said second long lever is pivotally connected to the top cover, so as to have said pair of first short levers moveable in a parallel manner with each other and thus allow said top cover to be first move in a parallel relationship with the base in a back-to-front direction and successively rotate relative to the base forwardly and upwardly when releasing said hood from said base.

* * * * *